United States Patent
Siergiej et al.

(10) Patent No.: US 11,240,061 B2
(45) Date of Patent: Feb. 1, 2022

(54) METHODS AND SYSTEMS FOR CONTROLLING LOCOMOTIVES

(71) Applicant: Progress Rail Locomotive Inc., LaGrange, IL (US)

(72) Inventors: Joseph Siergiej, Homer Glen, IL (US); Eugene T. Krakow, Madison, WI (US); Robert J. Pflaum, Cedar Lake, IN (US); Lawrence S. Przybylski, Lemont, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 318 days.

(21) Appl. No.: 16/429,721

(22) Filed: Jun. 3, 2019

(65) Prior Publication Data
US 2020/0382338 A1 Dec. 3, 2020

(51) Int. Cl.
*H04L 12/40* (2006.01)
*H04L 12/10* (2006.01)

(52) U.S. Cl.
CPC .............. *H04L 12/40* (2013.01); *H04L 12/10* (2013.01); *H04L 2012/40215* (2013.01); *H04L 2012/40293* (2013.01)

(58) Field of Classification Search
CPC ... H04L 12/10; H04L 12/40; H04L 12/40045; H04L 2012/40215; H04L 2012/40293
(Continued)

(56) References Cited

U.S. PATENT DOCUMENTS

| | | | |
|---|---|---|---|
| 6,587,476 B1 * | 7/2003 | Lewin | H04L 12/2856 370/467 |
| 6,647,428 B1 * | 11/2003 | Bannai | H04L 29/12009 370/253 |

(Continued)

FOREIGN PATENT DOCUMENTS

| | | |
|---|---|---|
| CN | 201134814 Y | 10/2008 |
| CN | 101369152 A | 2/2009 |

(Continued)

OTHER PUBLICATIONS

Tough choice: M12 vs RJ45 Ethernet connection systems (Year: 2008).*
US 9,986,068, 05/2018, (withdrawn)

*Primary Examiner* — Dung B Huynh
(74) *Attorney, Agent, or Firm* — Bookoff McAndrews PLLC

(57) ABSTRACT

According to one aspect of the present disclosure, a system for controlling a locomotive may comprise a controller; an Ethernet switch; one or more Ethernet modules in communication with the controller through the Ethernet switch, wherein a given Ethernet module of the one or more Ethernet modules includes a microcontroller and one or more connectors, wherein the microcontroller provides one or more communication interfaces; one or more power supplies connected to the one or more Ethernet modules and providing power to the one or more Ethernet modules; and one or more locomotive units in communication with the one or more Ethernet modules, wherein the one or more locomotive units are installed on the locomotive and controlled by the controller.

20 Claims, 4 Drawing Sheets

(58) Field of Classification Search
CPC .... B60T 13/665; B60T 17/221; B60T 17/228;
B60T 2270/88; B60T 8/1705; B61H
13/00; B61H 15/00; B61H 15/0018;
B61H 15/0072; B61H 15/0081; B61H
15/009
See application file for complete search history.

(56) References Cited

U.S. PATENT DOCUMENTS

| | | | |
|---|---|---|---|
| 7,451,238 B2 | 11/2008 | Taraci | |
| 7,740,501 B2 | 6/2010 | Ballard | |
| 7,783,814 B2 | 8/2010 | Lehzen | |
| 7,973,538 B2 | 7/2011 | Karam | |
| 8,228,946 B2 | 7/2012 | Hao et al. | |
| 8,284,798 B2 | 10/2012 | Diab | |
| 8,335,574 B2 | 12/2012 | Middlemiss | |
| 8,705,527 B1* | 4/2014 | Addepalli | H04L 61/2592 370/389 |
| 8,938,326 B1* | 1/2015 | Fanara | B61L 15/0027 701/19 |
| 9,295,142 B1 | 3/2016 | Leinen et al. | |
| 10,057,959 B2 | 8/2018 | Picard et al. | |
| 10,491,414 B1* | 11/2019 | Weed | H04W 12/086 |
| 2003/0031189 A1* | 2/2003 | Larson | H04L 29/06 370/401 |
| 2004/0066786 A1* | 4/2004 | Catterall | H04L 12/4625 370/400 |
| 2004/0157493 A1* | 8/2004 | Bergner | H01R 13/6477 439/607.41 |
| 2005/0044431 A1* | 2/2005 | Lang | G06F 1/266 713/300 |
| 2005/0171661 A1* | 8/2005 | Abdel-Malek | G07C 5/008 701/31.4 |
| 2005/0254818 A1* | 11/2005 | Zhou | H04B 10/25752 398/43 |
| 2006/0138285 A1* | 6/2006 | Oleski | B61L 15/0027 246/167 R |
| 2006/0180709 A1* | 8/2006 | Breton | H04L 61/2514 246/1 C |
| 2006/0218422 A1 | 9/2006 | Camagna et al. | |
| 2007/0025240 A1* | 2/2007 | Snide | H04L 12/40169 370/217 |
| 2007/0171912 A1* | 7/2007 | Mitsumori | H04L 12/5601 370/395.1 |
| 2007/0206630 A1* | 9/2007 | Bird | H04L 41/24 370/465 |
| 2007/0265712 A1* | 11/2007 | Leontiev | H04L 43/0817 700/3 |
| 2008/0159281 A1* | 7/2008 | Jesseph | H04L 12/4604 370/389 |
| 2008/0189748 A1* | 8/2008 | Bleacher | H04N 21/47202 725/76 |
| 2008/0232578 A1* | 9/2008 | Schoenberg | H04L 12/40045 379/413 |
| 2009/0110108 A1* | 4/2009 | Kennedy | H04B 3/54 375/295 |
| 2009/0112630 A1* | 4/2009 | Collins, Jr. | G16H 80/00 705/3 |
| 2010/0007750 A1* | 1/2010 | Lundberg | H04N 5/23241 348/211.3 |
| 2010/0029209 A1* | 2/2010 | Daum | H04L 69/40 455/59 |
| 2010/0044333 A1* | 2/2010 | Marvel | H04B 5/0093 213/1.3 |
| 2010/0048061 A1* | 2/2010 | Helmig | H05K 1/0228 439/620.23 |
| 2010/0091663 A1* | 4/2010 | Takeyama | H04L 49/602 370/242 |
| 2010/0241295 A1* | 9/2010 | Cooper | B60T 13/665 701/19 |
| 2010/0258682 A1* | 10/2010 | Fries | B61L 5/1881 246/1 C |
| 2011/0071691 A1* | 3/2011 | Bergeron | G06F 1/263 700/286 |
| 2012/0015552 A1* | 1/2012 | Diab | H04L 12/10 439/488 |
| 2012/0054507 A1* | 3/2012 | Noel | H04L 12/12 713/300 |
| 2013/0018560 A1* | 1/2013 | Smith | B60T 13/665 701/70 |
| 2013/0201316 A1* | 8/2013 | Binder | H04L 67/12 348/77 |
| 2013/0312043 A1* | 11/2013 | Stone | H04W 12/06 725/62 |
| 2014/0022912 A1* | 1/2014 | Kim | H04L 47/805 370/244 |
| 2014/0041011 A1* | 2/2014 | Beyer | B61L 15/0072 726/10 |
| 2014/0099890 A1* | 4/2014 | Lichter | H04B 5/02 455/41.1 |
| 2014/0107875 A1* | 4/2014 | Beyer | H04W 12/121 701/19 |
| 2014/0114507 A1* | 4/2014 | Kernwein | B60L 3/04 701/19 |
| 2014/0129060 A1* | 5/2014 | Cooper | G05D 1/0295 701/19 |
| 2014/0129061 A1* | 5/2014 | Cooper | B61C 17/12 701/19 |
| 2014/0156122 A1* | 6/2014 | Wiemeyer | B61C 17/12 701/19 |
| 2014/0247892 A1 | 9/2014 | Williams et al. | |
| 2014/0309870 A1* | 10/2014 | Ricci | A61B 5/6808 701/36 |
| 2014/0312698 A1* | 10/2014 | Kastner | B61L 15/0036 307/65 |
| 2014/0372773 A1 | 12/2014 | Heath et al. | |
| 2014/0379180 A1* | 12/2014 | Kral | B61C 7/04 701/19 |
| 2015/0200712 A1* | 7/2015 | Cooper | B60T 17/228 375/257 |
| 2015/0217790 A1* | 8/2015 | Golden | B61L 15/0036 701/19 |
| 2015/0229741 A1* | 8/2015 | Kim | H04L 67/12 370/467 |
| 2015/0268649 A1* | 9/2015 | Emerson | G05B 15/02 700/275 |
| 2015/0291190 A1* | 10/2015 | Habermehl | B61L 15/0036 246/166.1 |
| 2015/0341185 A1 | 11/2015 | Keller | |
| 2015/0371071 A1* | 12/2015 | Ciabattoni | H01R 33/00 235/454 |
| 2015/0372948 A1* | 12/2015 | Ara | H04L 49/25 370/338 |
| 2015/0372975 A1* | 12/2015 | Moriya | B61L 15/0018 726/12 |
| 2016/0094428 A1* | 3/2016 | St-Laurent | H04L 43/0894 370/253 |
| 2016/0127135 A1* | 5/2016 | Balasubramanian | H04L 12/40045 713/300 |
| 2016/0131712 A1* | 5/2016 | Bock | G01R 31/44 324/537 |
| 2016/0144871 A1* | 5/2016 | Jalla | B60L 1/003 105/27 |
| 2016/0227420 A1* | 8/2016 | Ho | H04W 12/033 |
| 2016/0355198 A1* | 12/2016 | Dulmage | B61L 3/008 |
| 2017/0072876 A1* | 3/2017 | Rajan | H04L 69/08 |
| 2017/0096154 A1* | 4/2017 | Hurst | B61L 15/0081 |
| 2017/0129511 A1* | 5/2017 | Crane | B60T 13/665 |
| 2017/0129512 A1* | 5/2017 | Shubs, Jr. | G07C 5/008 |
| 2017/0155585 A1* | 6/2017 | Meng | H04L 45/745 |
| 2017/0163474 A1* | 6/2017 | Schoonmaker | H04L 67/12 |
| 2017/0180328 A1* | 6/2017 | Loch | H04L 63/20 |
| 2017/0325444 A1* | 11/2017 | Crinklaw | B05B 12/122 |
| 2017/0334415 A1* | 11/2017 | Kumar | B60T 8/1705 |
| 2018/0062988 A1* | 3/2018 | Sikaria | H04L 69/22 |
| 2018/0170412 A1 | 6/2018 | Fischer | |
| 2018/0205615 A1* | 7/2018 | Fanara | H04L 45/02 |

(56) References Cited

U.S. PATENT DOCUMENTS

| | | | |
|---|---|---|---|
| 2018/0281598 A1* | 10/2018 | Shu | G05B 19/042 |
| 2018/0295535 A1* | 10/2018 | Kavars | G06F 1/28 |
| 2018/0359214 A1* | 12/2018 | Janneteau | H04L 61/2514 |
| 2019/0044290 A1* | 2/2019 | Fennen | H01R 13/506 |
| 2019/0071106 A1* | 3/2019 | Carlson | B61L 25/025 |
| 2019/0132426 A1* | 5/2019 | Kitamura | H04L 67/025 |
| 2019/0176862 A1* | 6/2019 | Kumar | G06K 9/00651 |
| 2019/0263432 A1* | 8/2019 | Carlson | B61L 15/0027 |
| 2019/0296936 A1* | 9/2019 | Kim | G05B 19/4185 |
| 2019/0300034 A1* | 10/2019 | Molne | B61L 23/04 |
| 2019/0311625 A1* | 10/2019 | Anvari | H04W 4/02 |
| 2019/0319394 A1* | 10/2019 | Trenkamp | H01R 27/02 |
| 2019/0394089 A1* | 12/2019 | Barrett | H04L 63/1416 |
| 2020/0001857 A1* | 1/2020 | Naylor | B60T 13/665 |
| 2020/0079343 A1* | 3/2020 | Martin | B60T 17/221 |
| 2020/0089648 A1* | 3/2020 | Klein | G06F 12/0246 |
| 2020/0094690 A1* | 3/2020 | Sondur | B61C 17/06 |
| 2020/0139995 A1* | 5/2020 | Loch | G07C 5/008 |
| 2020/0189635 A1* | 6/2020 | Hurst | B61L 15/0081 |
| 2020/0277950 A1* | 9/2020 | Rhyner | F04B 49/06 |
| 2020/0324798 A1* | 10/2020 | Beltramin | B61L 3/127 |
| 2021/0075807 A1* | 3/2021 | Park | H04L 63/029 |
| 2021/0086800 A1* | 3/2021 | Swenson | B61D 27/00 |
| 2021/0168820 A1* | 6/2021 | Hashimoto | H04W 52/243 |

FOREIGN PATENT DOCUMENTS

| | | |
|---|---|---|
| CN | 101741766 A | 6/2010 |
| CN | 201549004 U | 8/2010 |
| CN | 202259964 U | 5/2012 |
| CN | 103885374 A | 6/2014 |
| CN | 203708279 U | 7/2014 |
| CN | 102857366 B | 2/2015 |
| CN | 204229397 U | 3/2015 |
| CN | 102299807 B | 10/2015 |
| CN | 205490579 U | 8/2016 |
| CN | 103546485 B | 1/2017 |
| DE | 202009013171 U1 | 1/2010 |
| DE | 102014214225 A1 | 7/2015 |
| EP | 1625451 A1 | 2/2006 |
| EP | 2187275 B1 | 4/2016 |
| GB | 2476067 A | 6/2011 |
| WO | 2006051355 A1 | 5/2006 |
| WO | 2007121148 A2 | 10/2007 |
| WO | 2017151314 A1 | 9/2017 |

* cited by examiner

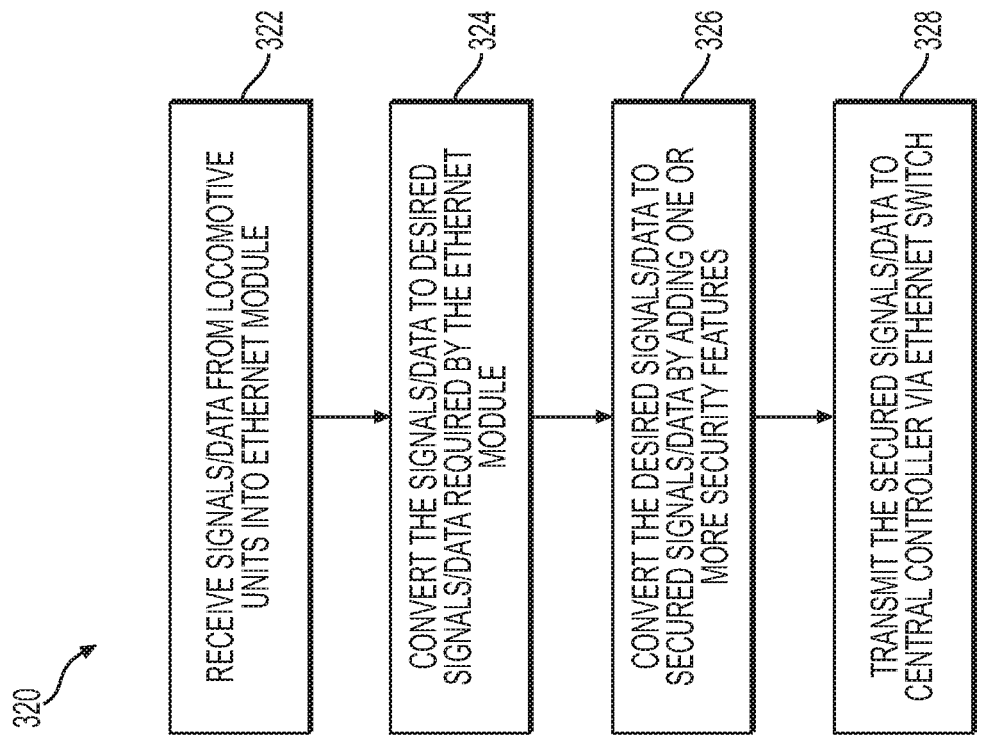
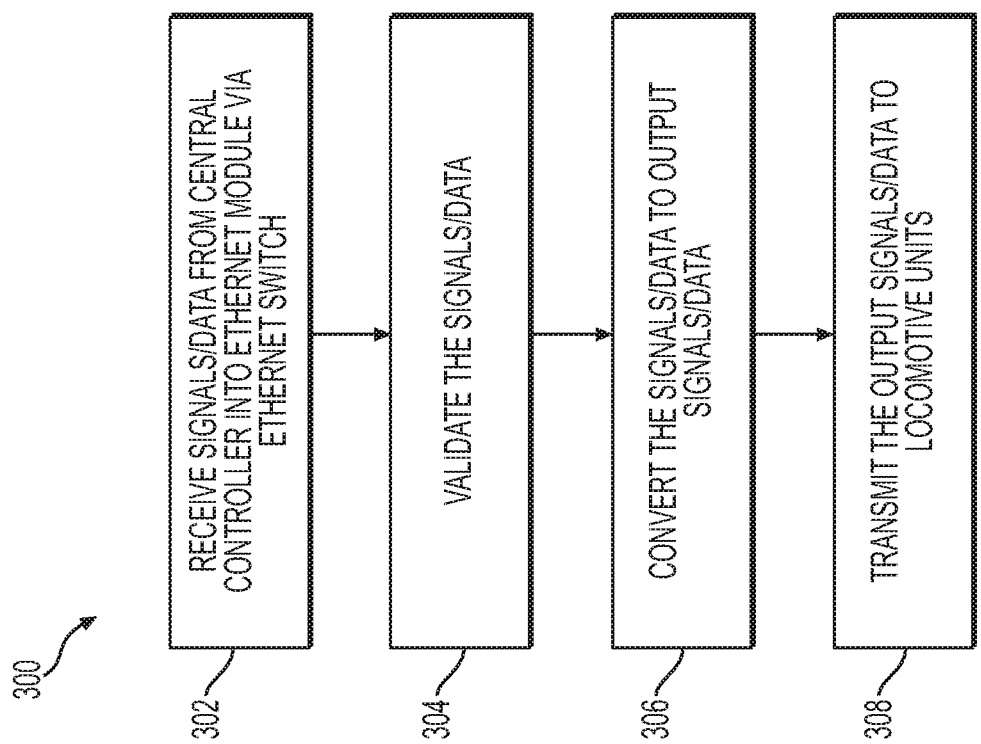
FIG. 3B
FIG. 3A

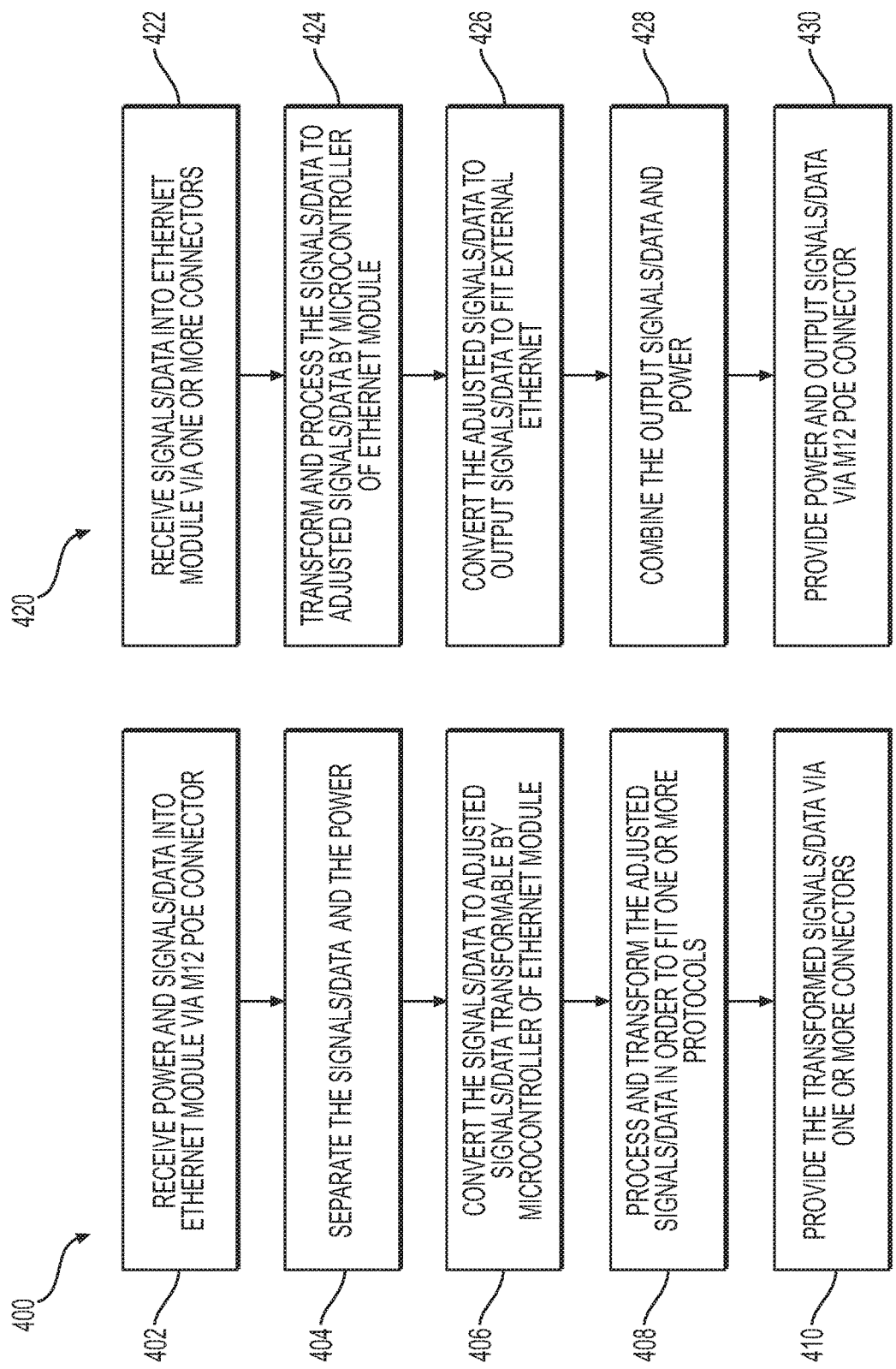

METHODS AND SYSTEMS FOR CONTROLLING LOCOMOTIVES

TECHNICAL FIELD

The present disclosure relates generally to methods and systems used in rail transport, and more particularly, to methods and systems for controlling locomotives.

BACKGROUND

A traditional system for controlling a locomotive may include a plurality of locomotive units (e.g., devices, sensors, or actuators) interfaced with a serial concentrator unit (SCU) through one or more communication interfaces. Each locomotive unit may utilize its own dedicated wiring and communication interface. The SCU may be the only computer engine in the traditional locomotive control system that is able to control all the communication interfaces. In this situation, the SCU may include extra communication interfaces and utilize extra wires, making the traditional locomotive control system bulky, expensive to operate, and incompatible with modern technologies.

U.S. Patent Application Publication No. 2018/0170412 A1 discloses a control arrangement for a vehicle, in particular a rail vehicle, having an operational control system which comprises at least one central control unit, a set of decentralized sub-system controls and a control network to which the control unit and the sub-system controls are connected. The control system is configured as an Ethernet network, in particular, according to the Profinet standard. The system of the '412 publication further includes interfaces connecting the sub-systems to the control networks. The interfaces are connected in a ring-shaped network structure. Such a system has limitations.

The systems and methods of the present disclosure may address or solve one or more of the problems set forth above and/or other problems in the art. The scope of the current disclosure, however, is defined by the attached claims, and not by the ability to solve any specific problem.

SUMMARY

According to one aspect of the present disclosure, a system for controlling a locomotive may comprise a controller; an Ethernet switch; one or more Ethernet modules in communication with the controller through the Ethernet switch, wherein a given Ethernet module of the one or more Ethernet modules includes a microcontroller and one or more connectors, wherein the microcontroller provides one or more communication interfaces; one or more power supplies connected to the one or more Ethernet modules and providing power to the one or more Ethernet modules; and one or more locomotive units in communication with the one or more Ethernet modules, wherein the one or more locomotive units are installed on the locomotive and controlled by the controller.

According to another aspect of the present disclosure, a method for controlling a locomotive may comprise receiving signals or data from a controller into an Ethernet module through an Ethernet switch; validating the signals or data; converting, by a microcontroller of the Ethernet module, the signals or data to output signals or data according to one or more communication protocols; and transmitting the output signals or data to one or more locomotive units or a Controller Area Network bus (CAN bus).

According to yet another aspect of the present disclosure, a method for controlling a locomotive may comprise receiving signals or data from a controller into a plurality of Ethernet modules through an Ethernet switch; converting, by a microcontroller of each Ethernet module, the signals or data to output signals or data according to one or more communication protocols; and transmitting the output signals or data to a plurality of locomotive units or a CAN bus.

BRIEF DESCRIPTION OF THE DRAWINGS

FIGS. 3A and 3B show exemplary methods of a central controller according to the system of FIG. 1.

FIGS. 4A and 4B show exemplary methods of an Ethernet module according to the system of FIG. 1.

DETAILED DESCRIPTION

Both the foregoing general description and the following detailed description are exemplary and explanatory only and are not restrictive of the features, as claimed. As used herein, the terms "includes," "comprising," "having," including," or other variations thereof, are intended to cover a non-exclusive inclusion such that a process, method, article, or apparatus that includes a list of elements does not include only those elements, but may include other elements not expressly listed or inherent to such a process, method, article, or apparatus.

Systems for Controlling Locomotives

Figure 1:
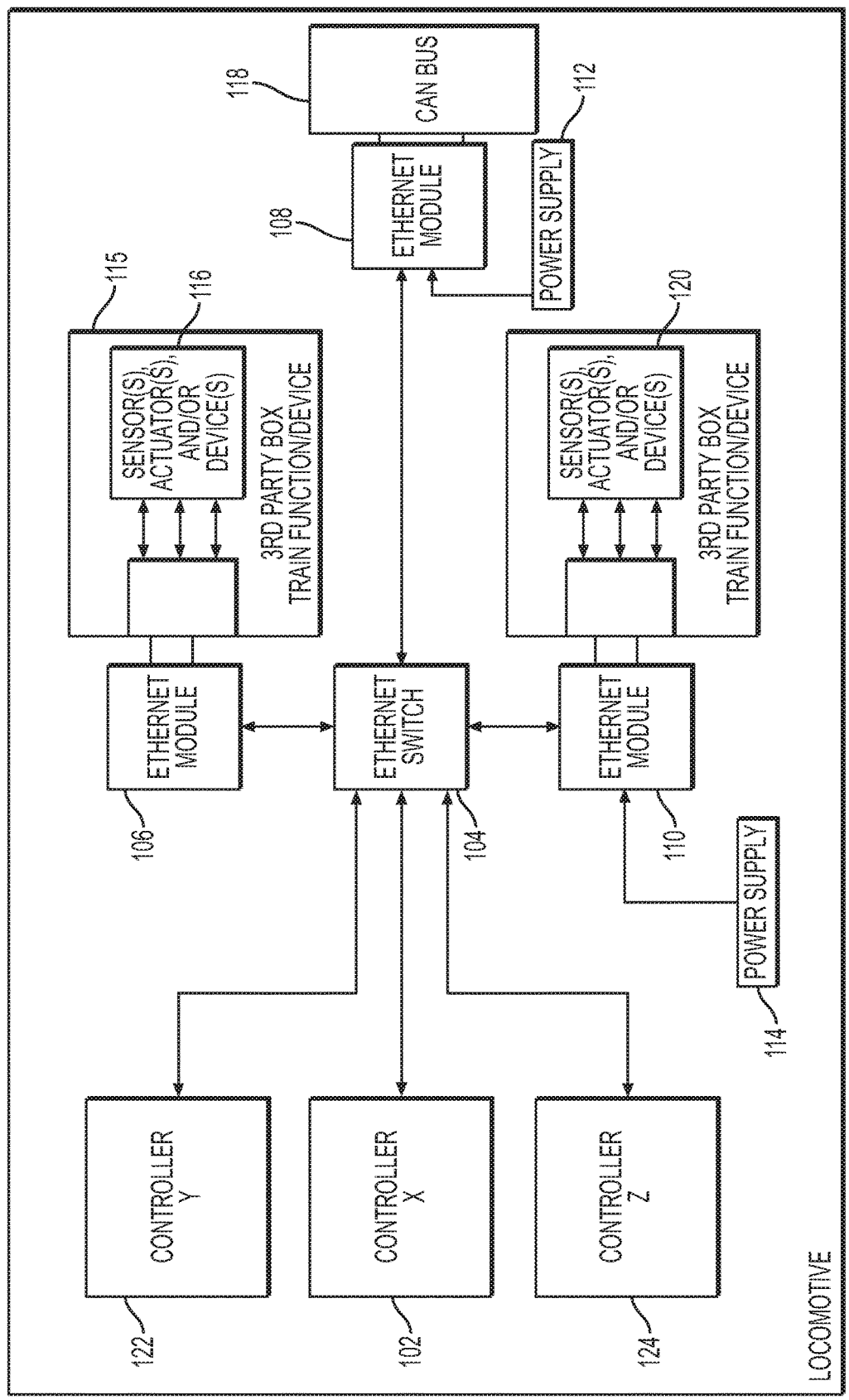
FIG. 1 shows an exemplary locomotive control system.

FIG. 1 shows an exemplary locomotive control system 100. As shown in FIG. 1, the locomotive control system 100 may include a central controller 102, an Ethernet switch 104, one or more Ethernet modules 106-110, one or more power supplies 112-114, and one or more locomotive units 116, 120.

The central controller 102 may be a locomotive control system computer. The central controller 102 may monitor a state of the system 100, including an operating time, an idle time, or an energy consumption of the system 100. The central controller 102 may also manage the engine, transmission and auxiliary devices of the locomotive, providing a train operator with an overview of locomotive performance and preventing faulty operations. The central controller 102 may be, for example, an EMD EM2000 controller from Progress Rail Services Corporation. The EM2000 controller may be a microprocessor-based controller. The central controller may perform a plurality of functions or operations, such as ground relay lockout reset switching, automatic horn sequencing, hot engine lead unit nullification, immersion heater protection, local alarm bell silencing, microprocessor-controlled cooling fan shuttering, integrated traction motor cutout, cooling system automatic draining, engine purge controlling, inertial filter blower alarming, low engine water detection, low water temperature speedup, lube oil filter by-pass detection, starter motor protection, extended range dynamic braking, self load testing, serial link to event recording, voltage compensation based on battery temperature, air compressor synchronization, air compressor low oil protection, microprocessor-controlled main reservoir drain heating, low main reservoir air pressure speed up, main reservoir blow down timing, lead truck sand detection, unpowered locked wheel detection, slow speed control, or winter isolation switching.

The Ethernet switch 104 may be a networking device that receives, processes, and forwards signals or data among different components (e.g., the central controller 102, locomotive units 116, 120, etc.) in the system 100. The Ethernet switch 104 may include a plurality of input or output (I/O) ports so that a signal introduced at the input of any port may appear at the output of every port except the original input port. The Ethernet switch 104 may authorize immediate transmission of a timing-critical Ethernet signals or data during the locomotive operation process, such as dangerous road conditions or engine overheating. The Ethernet switch 104 may detect inside problems, such as excessive collisions and jabbering on individual ports. In this situation, the Ethernet switch 104 may partition the port, disconnecting it from the shared medium. The Ethernet switch 104 may be attached to a control stand of the locomotive. The control stand may be an Association of American Railroads control stand. The control stand may be in communication with a controller (e.g., a central controller 102) and include one or more control panels. The control stand may be manufactured and tested alone prior to installing on the locomotive. In other embodiments, the Ethernet switch 104 may be placed at any other location on the locomotive.

The one or more Ethernet modules 106-110 may be in communication with the central controller 102 through the Ethernet switch 104. For example, as shown in FIG. 1, an Ethernet module 108 may be connected to the Ethernet switch 104, which is connected to the central controller 102, so that the Ethernet module 108 is in communication with the central controller 102. The Ethernet module 108 may also be connected to a CAN interface 118 so that signals or data can be transmitted between the central controller 102 and the CAN interface 118 through the Ethernet switch 104 and Ethernet module 108. In another example, the Ethernet module 106 may be in communication with the central controller 102 and connected a third party box 115 including a plurality of locomotive units 116 (e.g., sensors, actuators, or devices) so that signals or data can be transmitted between the central controller 102 and the plurality of locomotive units 116. Details of the Ethernet modules 106-110 are described elsewhere herein.

The one or more power supplies 112-114 may be connected to the one or more Ethernet modules 106-110 to provide power to the Ethernet modules. The one or more power supplies may include a 32-voltage, 72-voltage, or 74-voltage power source. As shown in FIG. 1, power supplies 112 and 114 are connected to Ethernet modules 108 and 110, respectively. In such an embodiment, a power supply is not connected to the Ethernet module 106. In this situation, the Ethernet module 106 may be powered through a power over Ethernet (POE), which passes electric power along with data to the Ethernet module 106.

The one or more locomotive units 116, 120 may be placed in the locomotive and controlled by the central controller 102. In other embodiments, some of the locomotive units 116, 120 may be placed at any other locations of a locomotive and/or controlled by secondary controllers. The one or more locomotive units 116, 120 may include one or more sensors, devices, and/or actuators. The sensors, devices, and/or actuators may include, for example, end-of-train (EOT) devices, head-of-train (HOT) devices, electronic air brakes, remote speed indicators, fuel tank monitors, and/or cab signal units.

The EOT devices may be electronic devices mounted on the end of a train. The EOT devices may be used to send signals or data and/or status reports (e.g., status of brakes) to the locomotive through telemetry. The EOT devices may transmit real-time information from the end of the train to the locomotive through HOT devices or different controllers (e.g., secondary controllers). The EOT devices may be powered under extreme weather, light weight, and easy to install. The EOT devices may further include readable displays and light-emitting diodes (LEDs) to assist individuals in viewing information about the EOT devices. The EOT devices may also include water proof printed circuit boards (PCB) and be able to provide real-time location tracking.

The HOT devices may be mounted on the top of a control stand and/or integrated into locomotive electronics. The HOT devices, when used with EOT devices, may provide information regarding the operation of the train. For instance, the HOT devices may provide information on the condition of the EOT devices, such as brake pipe pressure, marker state, movement and battery condition. The HOT devices may also perform communications tests between EOT devices and HOT devices, arm requests, and emergency brake commands resulting from an emergency switch activation or external emergency input.

The electronic air brakes may be responsible for applying and releasing a penalty brake, in response to a violation of any locomotive operating rules. The remote speed indicator (RSI) may provide locomotive speed information to a controller (e.g., a central controller) or an operator of the locomotive. The fuel tank monitors (FTM) may measure the amount of fuel in the locomotive fuel tank and communicate this information back to a controller (e.g., a central controller). The FTM may be in communication with automatic equipment identification (AEI), which provides a short-range unidirectional communications link between the locomotive and a wayside reader. The cab signal unit (CSU) may receive signals or data transmitted through running rails from a wayside cab signaling system communicating with a controller.

The system 100 may further include a plurality of secondary controllers, e.g. controller Y 122 and controller Z 124. The secondary controllers 122-124 may be in communication with the central controller 102 through the Ethernet switch 104. The secondary controllers 122-124 may control, and be in communication with, one or more locomotive units.

Ethernet Modules

Figure 2:
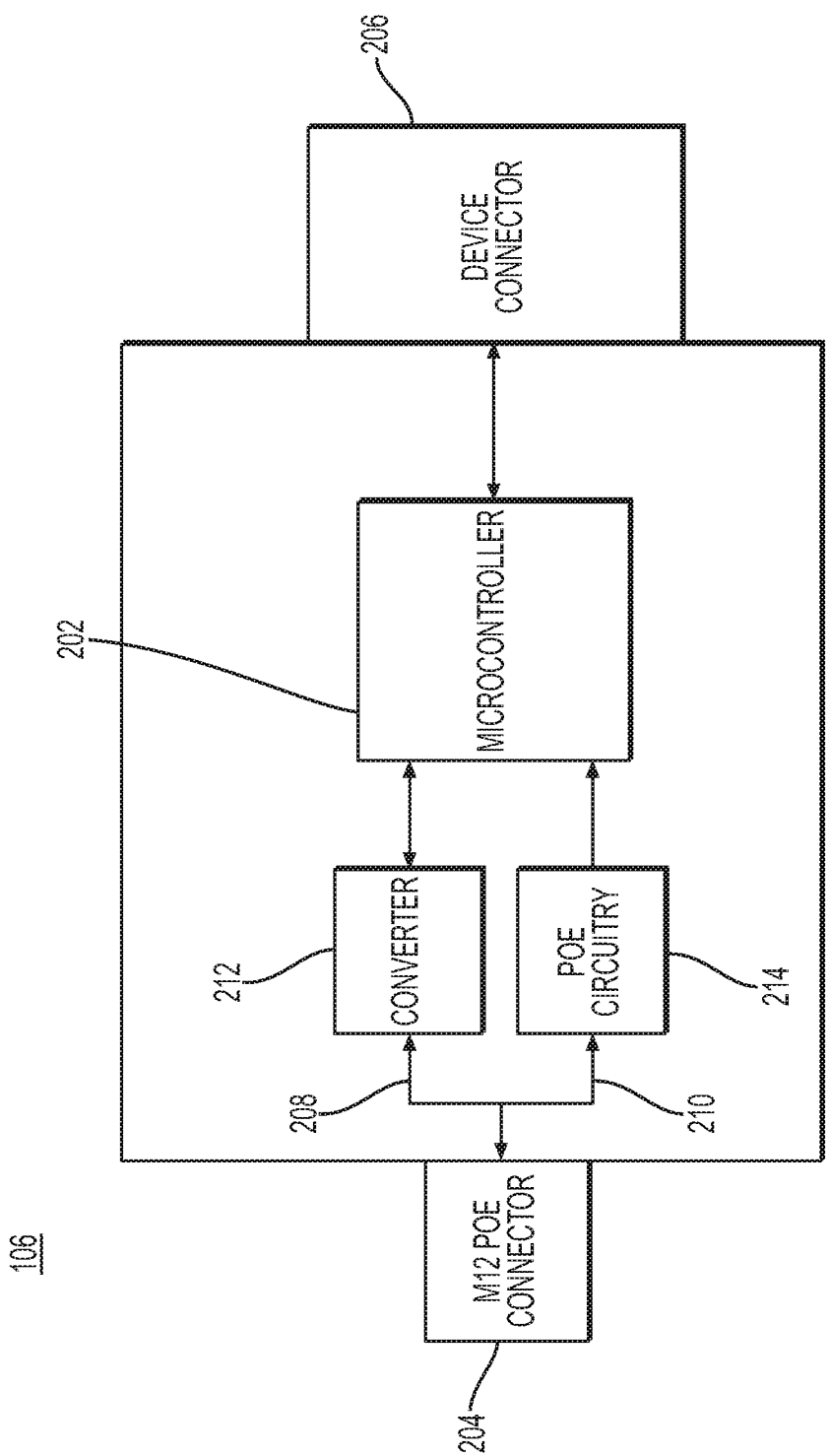
FIG. 2 shows an exemplary Ethernet module of the system of FIG. 1.

FIG. 2 shows an exemplary Ethernet module 106 of FIG. 1. As shown in FIG. 2, an Ethernet module 106 may include a microcontroller 202 and one or more connectors 204-206.

The microcontroller 202 may include a processor and memory on a single chip. The processor may be a 4-bit, 8-bit, 16-bit, 32-bit or 64-bit processor. The memory may include random access memory (RAM), flash memory, erasable programmable read-only memory (EPROM) or electrically erasable programmable read-only memory (EE-PROM). The microcontroller 202 may provide one or more communication interfaces. The communication interfaces may allow signals or data exchange between the Ethernet module 106 and locomotive units 116. The communication interface may include components used for signals exchange (e.g., plug and socket, connectors, wires, etc.); mechanical, electrical and logical signals passed across the components; and protocols for sequencing the signals.

The one or more communication interfaces of microcontroller 202 may include a CAN interface, a RS422 interface, a RS232 interface, or an input-output interface. The CAN interface may allow the signals or data exchange between the Ethernet module 106 and different locomotive units, such as parking assistant devices, collision avoidance devices, electric lockers, or auto start or stop devices. The RS422 interface may allow the signals or data exchange between the Ethernet module 106 and different locomotive units, such as electronic air brakes, remote speed indicators, fuel tank monitors, or cab signal units. The RS232 interface may allow the signals or data exchange between the Ethernet module 106 and different locomotive units, such as EOT devices and HOT devices. The input-output interface may allow the signals or data exchange between the Ethernet module 106 and different locomotive units, such as fan contactors coils and interlocks, controller mechanism switches, circuit breaker feedbacks, relay coils, and relay interlocks.

The one or more connectors may include an M12 power over Ethernet (POE) connector 204, an M12 power connector (not shown), or a device connector 206. The device connector 206 may be a Wago connector or a mating connector. The M12 POE connector 204 may be able to transmit both power and Ethernet signals. In other embodiments, the M12 POE connector 204 may not be able to transmit enough power to an Ethernet module. In this situation, an additional connector, such as an M12 power connector or a device connector, may be used to transmit power to the Ethernet module. The M12 power connector may be a 5-pin M12 power connector. The M12 POE connector 204 may be connected to a wire, which is connected to an Ethernet switch and carries Ethernet signals and/or power. The M12 POE connector 204 may be a 4-pin M12 POE connector or an 8-pin M12 POE connector. The device connector 206 (e.g., a Wago connector or mating connector) may be used for providing connections to one or more locomotive units or power supplies. Although an M12 POE connector and a device connector are shown in FIG. 2, an Ethernet module can include any number and combination of connectors. For instance, an Ethernet module can include an M12 POE connector, an M12 power connector, and a device connector. In another example, an Ethernet module can include an M12 POE connector and two device connectors.

The Ethernet module 106 may further include a conventional signal-power processor (not shown). The signal-power processor may separate signals and power received from the one or more connectors. The separated signals 208, 210 may include a signal 208 sent to a signal converter 212 and/or the microcontroller 202 for further processing, converting, or transforming. The separated power 210 may be used to drive interfaces, and power the microcontroller 202 and other components (e.g., circuits) in the Ethernet module 106. The signal-power processor may also combine signals and power and then provide combined signal and power to the M12 POE connector 204. The signal converter 212 may convert signals or data received from the one or more connectors to signals or data transformable by the microcontroller 202. The signal converter may also convert signals or data received from the microcontroller 202 to signals or data recognizable and/or transmittable by the M12 POE connector 204. In some embodiments, the signal-power processor and/or the signal converter 212 may be part of the microcontroller 202. The signals may be transformed and processed by the microcontroller 202. The Ethernet module may further include a POE circuitry 214. The POE circuitry 214 may include a plurality of POE powered components and/or DC-DC converters.

INDUSTRIAL APPLICABILITY

The disclosed aspects of the system for controlling a locomotive 100 may be used to facilitate signals or data exchange between controllers (e.g., a central controller 102, secondary controllers 122, 124, etc.) and one or more locomotive units, allowing the controllers to control one or more locomotive units. For instance, fuel tank monitors may send signals or data regarding the amount of fuel in locomotive fuel tanks to a central controller 102 through an Ethernet module 106-110, and the central controller 102 may then send control signals to a secondary controller 122, 124 of a locomotive engine to change the speed of the locomotive based on the amount of fuel. In another example, the central controller 102 may first receive and analyze track data from wayside locations and base-station radios through an Internet Of Things (TOT) architecture, and then provide an operator who manages a control stand with advance warning of speed limits and oncoming track conditions so that the operator can bring a locomotive to a safe speed or controlled stop. In yet another example, remote speed indicators may send signals or data regarding the speed of the locomotive to the central controller 102 through Ethernet modules 106-110, and the central controller 102 may then send control signals to electronic air brakes through Ethernet modules 106-110 to perform a stop because the speed of the locomotive is above a certain threshold.

FIG. 3A shows an exemplary method 300 for locomotive control system 100 of FIG. 1. The method 300 may include a first step 302 of receiving signals or data from a central controller 102 into one or more Ethernet modules 106-110 through an Ethernet switch 104. In step 302, the signals or data may first reach a connector 204 of the Ethernet module 106-110 through a wire connecting the Ethernet switch 104 and the Ethernet module 106-110, and then pass the connector 204 so the signals or data can be further processed by the Ethernet module 106-110. The connector may be an M12 POE connector.

The method 300 may then include a step 304 of validating the signals or data. The validating step 304 may be performed to check that the signals or data received are appropriate. For example, the signals or data received in step 302 may be marked or edited to ensure that such signals or data can be validated. The validating step 304 may be performed by the microcontroller 202 of the Ethernet module 106-110. In other embodiments, the validating step 304 may be performed by other components of the system or of the Ethernet module 106-110 (e.g., an Ethernet switch, connectors of the Ethernet module, wires, etc.).

The method 300 may then include a step 306 of converting the signals or data to output signals or data according to one or more communication protocols. The one or more communication protocols may include a CAN protocol, a RS422 protocol, a RS232 protocol, or an input-output protocol. Different locomotive units may utilize different communication protocols. For instance, EOT devices may use a RS232 protocol, and remote speed indicator may use a RS422 protocol. The converting step 306 may be performed by the microcontroller 202 of the Ethernet module 106-110. During the converting step 306, the signals or data may be transformed to output signals or data that fit communication protocols of receiving locomotive units 116, 120 or CAN bus 118.

The method 300 may further include a step 308 of transmitting the output signals or data to one or more locomotive units 116, 120 or CAN bus 118. In step 308, the output signals or data may pass a connector 206 of the Ethernet module 106-110 and then reach a locomotive unit 116, 120 or CAN bus 118 through a wire connecting the Ethernet module 106-110 and the locomotive unit 116, 120 or CAN bus 118.

FIG. 3B shows another exemplary method 320 for locomotive control system 100 of FIG. 1. The method 320 may include a first step 322 of receiving signals or data from one or more locomotive units 116, 120 or CAN bus 118 into one or more Ethernet modules 106-110. In step 322, the signals or data may first reach a connector 206 of the Ethernet module 106-110 through a wire connecting a locomotive unit 116, 120 or CAN bus 118 and the Ethernet module 106-110, and then pass the connector 206 of the Ethernet module 106-110 so the signals or data can be further processed by the Ethernet module 106-110.

The method 320 may then include a step 324 of converting the signals or data to desired signals or data required by the Ethernet module 106-110. The converting step 324 may be performed by the microcontroller 202 of the Ethernet module 106-110. During the converting step 324, the signals or data may be transformed to desired signals or data that fits Ethernet protocols used in the Ethernet module 106-110.

The method 320 may further include a step 326 of converting the desired signals or data to secured signals or data. The converting step 326 may be performed by a microcontroller 202 in the Ethernet module 106-110. In other embodiments, the converting step 326 may be performed by other components of the Ethernet module 106-110 or system 100 (e.g., an Ethernet switch, wires, etc.). One or more security features may be added to the desired signals or data during the converting step 326 so that the secured signals or data may be safer to be transmitted or harder to be confused with other signals or data. Although signals or data are secured in the converting step 326 in this example, the signals or data can be secured at any stage, for example, at a transmitting step, a receiving step, or a validating step.

The method 320 may further include a step 328 of transmitting the secured signals or data to a central controller 102 via an Ethernet switch 104. In the step 328, the secured signals or data may pass the Ethernet module 106-110 and the Ethernet switch 104 to reach the central controller 102.

FIG. 4A shows yet another exemplary method 400 of locomotive control system 100 of FIG. 1. The method 400 may include a first step 402 of receiving power and signals or data into an Ethernet module 106-110 via an M12 POE connector 204. In step 402, both the power and signals or data may first reach an Ethernet module 106-110 through a wire connecting an Ethernet switch 104 and the Ethernet module 106-110, and then pass the M12 POE connector 204 of the Ethernet module 106-110 to be further processed by the Ethernet module 106-110.

The method 400 may further include a step 404 of separating the power and signals or data. The step 404 may be performed by a signal-power processor (not shown) of the Ethernet module 106-110. The signal-power processor may provide an isolation barrier that only allows signals or data 208 to pass. The separated signals 208 may be sent to a signal converter 212 and/or the microcontroller 202 for further processing, converting, or transforming. The separated power 210 may be used to drive interfaces, and power the microcontroller and other components in the Ethernet module 106-110.

The method 400 may further include a step 406 of converting the signals or data to adjusted signals or data transformable by microcontroller 202. During the converting step 406, the signals or data may be level translated to adjusted signals or data that may be correctly recognized and/or transformed by a microcontroller 202. The converting step 406 may be performed by the signal converter 212, the microcontroller 202, or other components of the Ethernet module 106-110.

The method 400 may further include a step 408 of processing and transforming the adjusted signals or data in order to fit one or more communication protocols. The step 408 of processing and transforming may be performed by the microcontroller 202 of the Ethernet module 106-110. During the step 408 of processing and transforming, the microcontroller 202 may process the adjusted signals or data using one or a combination of the following methods: (1) configuration prior to installation; (2) a key implemented as part of the connector 204, 206 to identify the locomotive unit 116, 120 connected to the connector 204, 206; (3) strapping on an associated printed circuit board for an Ethernet module 106-110; or (4) dynamic configuration after installation to determine to accept the Ethernet data and one or more communication protocols for processing and transforming. The microcontroller 202 may also process the adjusted signals or data based on a logical data flow or a physical data flow. The adjusted signals or data may then be isolated and level shifted to transformed signals or data to fit one or more communication protocols. The transformed signals or data may be correctly recognized by one or more locomotive units 116, 120 or CAN bus 118.

The method 400 may further include a step 410 of providing the transformed signals or data via one or more connectors 206. As noted above, the one or more connectors 206 may include a device connector. The one or more connectors 206 may be connected to one or more locomotive units 116, 120 or CAN bus 118 that can receive the transformed signals or data.

FIG. 4B shows yet another exemplary method 420 of locomotive control system 100 of FIG. 1. The method 420 may include a first step 422 of receiving signals or data into an Ethernet module 106-110 via one or more connectors 206. In step 422, signals or data may first reach a connector of the Ethernet module 106-110 through a wire connecting a locomotive unit 116, 120 or CAN bus 118 and the Ethernet module 106-110, and then pass the connector 206 of the Ethernet module 106-110 so the signals or data can be further processed by the Ethernet module 106-110.

The method 420 may further include a step 424 of transforming and processing the signals or data to adjusted signals or data by the microcontroller 202 of the Ethernet module 106-110. During the step 424 of processing and transforming, the signals or data may be isolated and level shifted to adjusted signals or data that can be correctly recognized and/or transformed by the microcontroller 202, and then the microcontroller 202 may process the adjusted signals or data using one or a combination of the following methods: (1) configuration prior to installation; (2) a key implemented as part of the connector 204, 206 to identify the locomotive unit 116, 120 connected to the connector 204, 206; strapping on the associated printed circuit board for an Ethernet module 106-110; or (4) dynamic configuration after installation including obtaining published data and/or the received signals or data, packeting the published data and/or received signal or data into Ethernet signals or data, and sending the Ethernet signals or data to certain destinations (e.g., locomotive units 116, 120). The microcontroller 202 may also process the adjusted signals or data based on a logical data flow or a physical data flow.

The method 420 may further include a step 426 of converting the adjusted signals or data to output signals or data. During the converting step 426, the adjusted signals or data may be isolated and level translated to output signals or data to fit the Ethernet protocol. The converting step 426 may be performed by the signal converter 212, the microcontroller 202, or other components of the Ethernet module 106-110.

The method 420 may further include a step 428 of combining the output signals or data 208 and power 210. The combining step 428 may be performed by a signal-power processor (not shown). The method 420 may further include a step 430 of providing the power and output signals or data via an M12 POE connector 204. In step 430, both the power and signals or data 208, 210 may first pass the M12 POE connector 204 of the Ethernet module 106-110 and then reach an Ethernet switch 104 through a wire connecting the Ethernet switch 104 and the Ethernet module 106-110.

The locomotive control system 100 disclosed herein may assist in providing a control system that is smaller in scale, cost effective, energy efficient, and compatible with modern technologies. For example, control system 100 may include a smaller controller to replace a serial concentrator unit (SCU), and the smaller controller may be one of several computer engines that can communicate via a common module (Ethernet modules 106-110) with a plurality of locomotive units (e.g., devices, sensors, or actuators). Thus, control system 100 may assist in freeing up limited real estate for locomotive cab electronics. Additionally, the system 100 may be compatible with Ethernet technologies and Internet Of Things (IOT) architectures.

Further, the distributed nature of locomotive control system 100 may allow a failure to be localized to a single serial connection, allowing for better limp home capabilities. Control system 100 may also provide for a high availability architecture where control is running on multiple processors in a hot stand-by configuration.

It will be apparent to those skilled in the art that various modifications and variations can be made to the disclosed methods and systems for controlling locomotives without departing from the scope of the disclosure. Other embodiments of methods and systems for controlling locomotives will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A system for controlling a locomotive, comprising:
a controller;
an Ethernet switch;
one or more Ethernet modules in communication with the controller through the Ethernet switch, wherein a first Ethernet module of the one or more Ethernet modules includes a microcontroller, a signal-power processor, and one or more connectors, wherein the microcontroller provides one or more communication interfaces, and the one or more connectors includes a device connector and a power over Ethernet (POE) connector connected to the Ethernet switch to carry Ethernet signals and power;
one or more power supplies connected to the one or more Ethernet modules, wherein a second Ethernet module of the one or more Ethernet modules includes a microcontroller and a power connector, and a given power supply of the one or more power supplies is connected to the power connector and providing power to the one or more Ethernet modules; and
one or more locomotive units in communication with the one or more Ethernet modules, wherein the one or more locomotive units are installed on the locomotive and controlled by the controller and at least one of the one or more locomotive units is connected to the device connector, wherein:
the signal-power processor is configured to separate signals and power received from the one or more connectors, the separated signals being sent to at least one of the microcontroller or a signal converter to control the one or more locomotive units, and the separated power being used to power the first Ethernet module.

2. The system of claim 1, further comprising secondary controllers in communication with the controller through the Ethernet switch.

3. The system of claim 2, wherein the one or more secondary controllers control the one or more locomotive units.

4. The system of claim 1, wherein the controller is an EM2000 controller.

5. The system of claim 1, wherein the POE connector includes an M12 POE (power over Ethernet) connector, or an M12 power connector.

6. The system of claim 5, wherein the M12 POE connector is an 8-pin M12 POE connector.

7. The system of claim 5, wherein the M12 power connector is connected to the given power supply of the one or more power supplies.

8. The system of claim 5, wherein the M12 POE connector is connected to the Ethernet switch.

9. The system of claim 1, wherein the device connector is a mating connector or a Wago connector.

10. The system of claim 1, wherein the one or more Ethernet modules includes a third Ethernet module including a microcontroller and one or more connectors, the one or more connectors including a second device connector connected to a Controller Area Network (CAN) bus.

11. The system of claim 10, wherein the third Ethernet module is connected to a CAN interface and a second power supply of the one or more power supplies.

12. The system of claim 1, wherein the one or more communication interfaces include a CAN interface, a RS422 interface, a RS232 interface, or an input-output interface.

13. The system of claim 1, wherein the one or more locomotive units include one or more sensors, devices, or actuators.

14. The system of claim 13, wherein the one or more sensors, devices, or actuators include end-of-train devices, head-of-train devices, electronic air brakes, remote speed indicators, fuel tank monitors, or cab signal units.

15. The system of claim 1, wherein the second Ethernet module is connected to one or more locomotive units.

16. A method for controlling a locomotive, comprising:
receiving power and signals or data from one or more first locomotive units via a controller into an Ethernet module through an Ethernet switch, the one or more first locomotive units including at least one of a speed indicator, a fuel tank monitor, or a cab signal unit;
separating the received power and signals or data;
sending the separated signals to a microcontroller of the Ethernet module;
validating the signals or data;
converting, by the microcontroller of the Ethernet module, the signals or data to output signals or data according to one or more communication protocols;
transmitting the output signals or data to one or more second locomotive units, the one or more second locomotive units including an electronic air brake; and controlling the electronic air brake based on the received signals or data using the transmitted output signals or data.

17. The method of claim 16, wherein the signals or data are secured.

18. The method of claim 16, wherein the one or more communication protocols include a CAN protocol, a RS422 protocol, a RS232 protocol, or an input-output protocol.

19. The method of claim 16, wherein the one or more locomotive units include a plurality of locomotive units, the plurality of locomotive units comprising one or more sensors, devices, and actuators.

20. A method for controlling a locomotive, comprising:
receiving power and signals or data from one or more first locomotive units via a controller into a plurality of Ethernet modules through an Ethernet switch, the one or more first locomotive units including at least one of a speed indicator, a fuel tank monitor, a cab signal unit, a head-of-train device, or an end-of-train device;
separating the received power and signals or data;
sending the separated signals to a microcontroller of the Ethernet module;
converting, by the microcontroller of each Ethernet module, the signals or data to output signals or data according to one or more communication protocols; and
transmitting the output signals or data to a plurality of second locomotive units, the plurality of second locomotive units including an electronic air brake; and
controlling the electronic air brake using the received signals or data and the transmitted output signals or data.

* * * * *